Patented July 9, 1929.

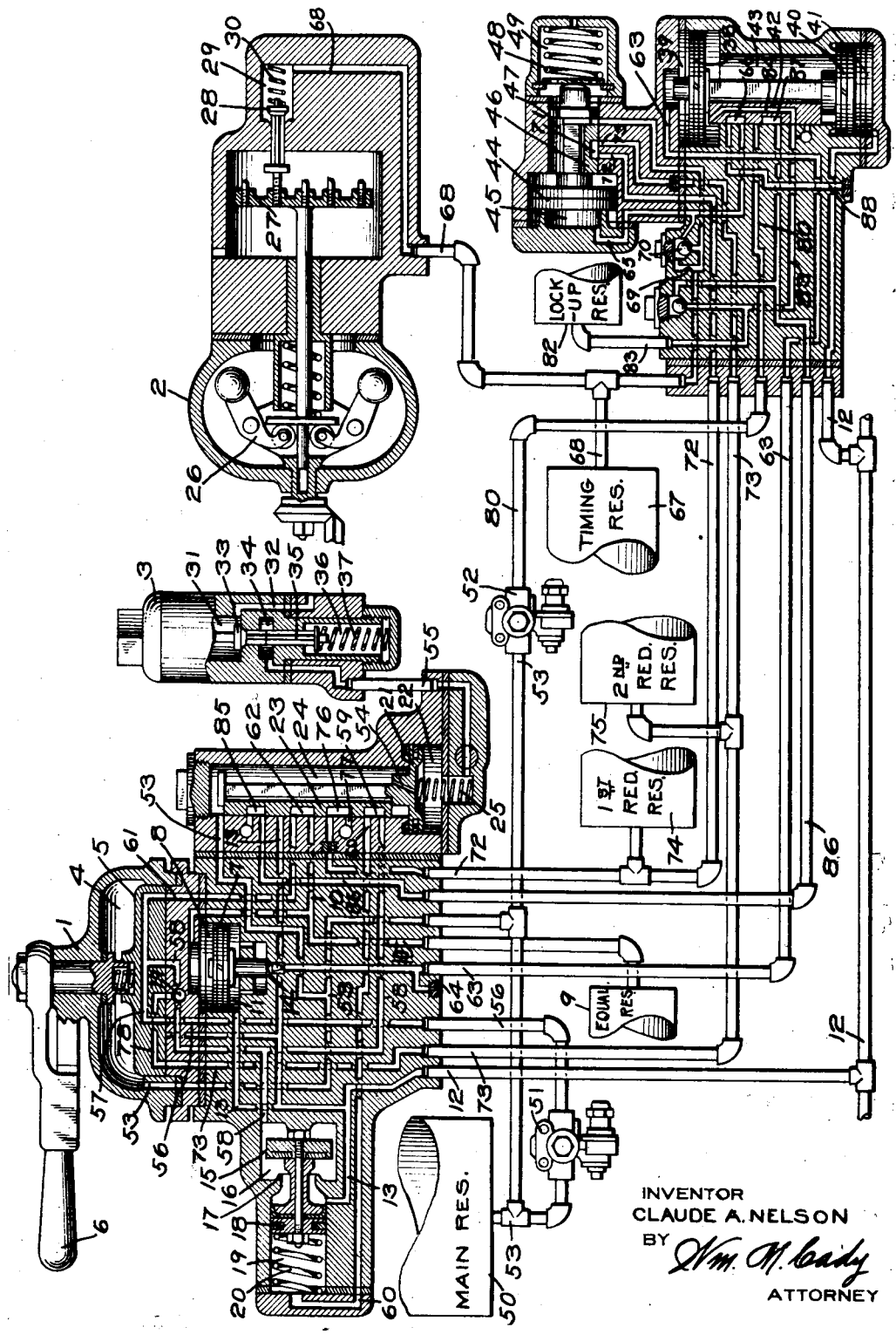

1,720,288

UNITED STATES PATENT OFFICE.

CLAUDE A. NELSON, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRAIN-CONTROL DEVICE.

Application filed August 2, 1927. Serial No. 210,032.

This invention relates to automatic train control apparatus and more particularly to that type having means for automatically effecting a brake pipe reduction in two stages.

When an engineer effects a brake application by manipulation of the usual brake valve device, it is a usual practice to first make a light brake pipe reduction and cause a light application of the brakes, in order to cause the slack between the cars in the train to run in gently and then to make a second and heavier brake pipe reduction to apply the brakes with the desired force.

Whether or not a two stage reduction in brake pipe pressure is required for applying the brakes on a train is mainly dependent upon the speed of the train. If the train speed is low, the retarding force on a train caused by an application of the brakes is greater than if a similar brake application is effected on a train running at a higher speed, so that as a result, when the train speed is high, the brakes may be applied by effecting a continuous and full brake pipe reduction, without causing any damage to the train.

An object of the invention is to provide an improved automatic train control apparatus having novel means for automatically effecting a continuous reduction in brake pipe pressure when the speed of a train, to which the apparatus is applied, is above a predetermined speed limit, and for automatically effecting a two stage or split reduction in brake pipe pressure when the speed of the train is below said predetermined speed limit.

Another object of the invention is to provide an automatic train control apparatus having a speed governor valve device so combined with a two stage or split reduction device that either a continuous or a two stage reduction in brake pipe pressure may be effected, said reductions being controlled by the operation of the speed governor valve device.

In the drawing, the single figure is a diagrammatic view of a train control equipment embodying my invention.

As shown in the drawing, the train control equipment comprises an automatic brake valve device 1, a governor valve device 2, a magnet valve device 3 and a split or two stage reduction valve device.

The automatic brake valve device 1 is of the usual type employed on locomotives equipped with automatic train control apparatus, and may comprise a casing having a chamber 4 containing a rotary valve 5 adapted to be operated by a handle 6, and also contains an equalizing piston mechanism, which comprises an equalizing piston 7, forming at one side a chamber 8 connected to an equalizing reservoir 9 through a passage 10, and forming at the opposite side a chamber 11 connected to the brake pipe 12 through a passage 13. The equalizing piston 7 is adapted to operate the usual brake pipe discharge valve 14 for venting fluid under pressure from the brake pipe to the atmosphere.

The brake valve device further comprises a cut-off valve 15 contained in a chamber 16 and adapted, in one position, to seal on a seat ring 17. Said cut-off valve is connected by a stem to a piston 18 contained in a chamber 19 and is adapted to be operated by said piston. A spring 20, contained in the chamber 19, opposes outward movement of the piston 18.

Associated with the brake valve device is an application valve portion which comprises a piston 21 contained in a chamber 22 and also comprises a slide valve 23 contained in a chamber 24 and is adapted to be operated by said piston, outward movement of said piston being opposed by the pressure of a spring 25.

The governor valve device 2 is of the usual centrifugal type, having a governor portion 26 adapted to be rotated according to the speed of the train. The governor portion 26 is adapted to shift a crosshead 27 having a plurality of adjustable tappet stems adapted to engage corresponding valve stems at various train speeds, such as the stem of a medium speed valve 28, which is contained in a chamber 29. A spring 30, also contained in chamber 29, engages the valve 28 and opposes the unseating of such valve.

The magnet valve device 3 comprises a casing containing a magnet and having a chamber 31 connected to the atmosphere through passage 32, said chamber containing a valve 33 adapted to be operated by said magnet. The valve 33 has a fluted stem extending through a wall in the casing and into chamber 34, in which chamber said stem engages a fluted stem 35 which extends through another wall in the casing and into chamber 36, in which chamber, a spring 37 engages a thrust washer mounted on the lower end of said stem.

The split reduction valve device is similar to that disclosed in the pending application of T. H. Thomas and Earle S. Cook, Serial No. 109,044, filed May 14, 1926, and may comprise a control portion and a hold-back portion. The control portion comprises a piston 38 contained in a chamber 39 and a piston 40 contained in a chamber 41, the areas of said pistons differing from each other. These pistons are connected together by a stem and are adapted to operate a slide valve 42 contained in a valve chamber 43. The hold-back portion comprises a piston 44 contained in a chamber 45 and also comprises a slide valve 46 contained in a chamber 47 and said slide valve is adapted to be operated by said piston. Inward movement of the piston 44 is opposed by the pressure of a spring 48, contained in a chamber 49.

In operation, fluid under pressure is supplied from a main reservoir 50 to the rotary valve chamber 4 of the brake valve device 1, to the application valve chamber 24 and to the feed valve devices 51 and 52, by way of pipes and passages 53. Fluid from the application valve chamber 24 flows through a port 54 in the application piston 21 into the piston chamber 22 and from thence through the passage and pipe 55 to the chamber 34 in the magnet valve device. With the magnet energized, the magnet valve 33 is seated, so that the pressure of the fluid in the application piston chamber 22 and the magnet chamber 34 becomes equal to the pressure of the fluid in the application valve chamber 24, thereby permitting the pressure of the coil spring 25 to hold the application piston 21 and slide valve 23 in the release position, as shown in the drawing.

Fluid, at the usual pressure employed in the brake pipe 12, is supplied by the feed valve device 51 to pipe and passage 56 leading to the seat of the rotary valve 5, and with the brake valve device in release position, as shown in the drawing, fluid from passage 56 flows through port 57 in the rotary valve and passage 58 to the cut-off valve chamber 16 and also flows from passage 58 through cavity 59 in the application slide valve 23 and passage 60 to the cut-off valve piston chamber 19. The opposing fluid pressures on the cut-off valve piston 18 and valve 15 thereby becomes equal, and the pressure of spring 20 shifts said cut-off valve piston and valve inwardly, thereby opening communication between the cut-off valve chamber 16 and the passage 13, so that fluid at feed valve pressure from the valve chamber 16 is permitted to flow to the brake pipe 12 and to the equalizing piston chamber 11 and charge same. Fluid, at feed valve pressure, also flows from port 57 in the rotary valve 5 to the equalizing reservoir 9 and to the equalizing piston chamber 8 by way of passage 61, cavity 62 in the application slide valve 23 and passage 10. The fluid pressure thus becomes equal on the opposite sides of the equalizing piston 7, which ensures the seating of the discharge valve 14.

With the discharge valve 14 seated, the control piston chamber 39 is vented to the atmosphere through a passage and pipe 63 and an atmospheric exhaust choke plug 64, so that the pressure of the brake pipe fluid in the control piston chamber 41 is permitted to hold the control pistons 38 and 40 and the slide valve 42 in their upper position, as shown in the drawing, in which position, the hold-back piston chamber 45 is vented to the atmosphere through passage 65, cavity 66 in the control slide valve 42 and the exhaust passage 88. A timing reservoir 67 is also vented to the atmosphere, being connected to passage 65 through pipe and passage 68, the chocked passage 69, and past a ball check valve 70.

With the hold-back piston chamber 45 at atmospheric pressure, the pressure of the spring 48 is adapted to hold the hold-back piston 44 and slide valve 46 in their outward position, as shown in the drawing, in which position, a cavity 71 in the slide valve connects passages 72 and 73 leading to a first reduction reservoir 74 and a second reduction reservoir 75, respectively. The first reduction reservoir 74 is normally vented to the atmosphere through pipe and passage 72, cavity 76 in the application slide valve 23 and the atmospheric exhaust passage 77, while the second reduction reservoir is normally vented to the atmosphere through pipe and passage 73, cavity 78 in the rotary valve 5 of the brake valve device 1 and the atmospheric exhaust passage 79.

Fluid at the pressure supplied by the feed valve device 52 for operation of the split reduction device is supplied to the seat of the control slide valve 42, through pipe and passage 80.

According to my invention, the timing reservoir 67 is connected to the valve chamber 29 in the governor, so that when the governor valve 28 is unseated, as in the case of the speed of the train being above a medium speed limit, the fluid in the timing reservoir will be maintained at atmospheric pressure.

If a train is operating above a perdetermined speed limit and a change in signal indication occurs, the magnet of the magnet valve device is deenergized and the pressure of the spring 37 unseats the manget valve 33. The application piston chamber 22 is thereby vented to the atmosphere by way of passage 55, chamber 34 and passage 32. The fluid under pressure in the valve chamber 24 then shifts the application piston 21 and slide valve 23 to their outward or application position, in which position, the cavity 76 in said slide valve, connects the cut-off valve piston chamber 19 to the atmosphere through passage 60 and the atmospheric exhaust passage 77. The opposing brake pipe pressure on the cut-off valve piston then shifts said piston and the cut-off valve 15 outwardly and seats the cut-off valve 15 on the seat ring 17, thereby preventing further flow of fluid at feed valve pressure to the brake pipe 12 and to the equalizing piston chamber 11. In the application position of the application slide valve 23, cavity 62 therein, connects the equalizing reservoir 9 and equalizing piston chamber 8 to the first reduction reservoir 74 by way of passages 10 and 72, so that the fluid under pressure from the equalizing reservoir flows to the first reduction reservoir, thereby permitting the pressure in the equalizing piston chamber 8 to reduce. The equalizing piston mechanism then operates in the well known manner to effect a brake pipe reduction. The fluid thus discharged from the brake pipe is partially vented to the atmosphere through the choke plug 64, but since the capacity of said choke plug is less than the rate at which fluid is vented from the brake pipe into passage and pipe 63, a pressure is built up in said passage and pipe and the connected control piston chamber 39, and in said chamber said pressure acts on the control piston 38 and shifts said piston and piston 40, and the slide valve 42 to the downward or first reduction position, in which position, fluid under pressure is supplied from the feed valve device 52 to the hold-back piston chamber 45 through pipe and passage 80, cavity 66 in the control slide valve 42 and passage 65. Fluid from passage 65 also flows through the choked passage 69 and passage and pipe 68 to the timing reservoir 67 and to the governor valve chamber 29. Since the governor valve 28 is unseated, with the train speed above a predetermined speed limit, the fluid under pressure supplied to the timing reservoir and the valve chamber 29 is vented to the atmosphere, so that a pressure is prevented from building up therein.

The rate of supplying fluid under pressure to the hold-back piston chamber 45 is in excess of the capacity of the choked passage 69, so that a pressure is thereby built up in said piston chamber, which shifts the hold-back piston 44 and slide valve 46 to their inner position, in which position, cavity 71 in said slide valve does not connect the passages 72 and 73 leading to the first and second reduction reservoirs 74 and 75. As a result, the first reduction in equalizing reservoir pressure is limited to that caused by equalization into the first reduction reservoir.

When the brake pipe pressure is reduced to a degree corresponding substantially to the degree of first reduction in equalizing reservoir pressure, the brake pipe discharge valve 14 starts to close and throttle the flow of fluid under pressure from the brake pipe into the passage and pipe 63. When the rate of discharge past the discharge valve 14 thus becomes less than the venting capacity of the choke plug 64, the pressure in the control piston chamber 39 starts to reduce and when reduced a predetermined degree, the brake pipe pressure, acting on the control piston 40, shifts the control pistons 38 and 40 and slide valve 42 to their upward position, in which position, the hold-back piston chamber 45 is vented to the atmosphere through passage 65, cavity 66 in the control slide valve 42 and the atmospheric exhaust passage 88. The pressure of spring 48 then shifts the hold-back piston 44 and slide valve 46 to their outward position, in which position, the first reduction reservoir 74 is connected to the second reduction reservoir 75 through passage 72, cavity 71 in the hold-back slide valve and passage 73. The fluid under pressure from the first reduction reservoir and the equalizing reservoir 9 is thereby permitted to flow to the second reduction reservoir 75 and cause a second reduction in equalizing reservoir pressure. Since the equalizing piston chamber 8 is connected to the equalizing reservoir 9 through passage 10, a corresponding second reduction in pressure occurs therein, which causes the equalizing piston mechanism to operate and cause a further reduction in brake pipe pressure. It will be noted that the discharge valve 14 does not fully close in order to permit the split reduction device to initiate the second reduction in equalizing reservoir pressure, so that as a result, the brake pipe reduction caused by both the first and second reductions in equalizing reservoir pressure, is a continuous reduction.

The control portion of the split reduction device is prevented from operating during the second reduction because fluid under pressure from a lock-up reservoir 82 flows to the control valve chamber 43 through passages 83, and port 84 in the control slide valve 42 and therein acts on the control piston 38 to prevent the fluid discharged from the brake pipe into chamber 39, from shifting said piston downwardly. Said lock-up reservoir becomes charged during the first reduction with fluid under pressure from the brake pipe 12, by way of passage 13, cavity 85 in the application slide valve 23, passage and pipe 86, cavity 87 in the control slide valve 42 and passage and pipe 83.

In order to limit the degree of the second reduction, it is necessary to move the brake valve to lap position, in which position, the atmospheric connection of passage 73 from the second reduction reservoir is lapped by the rotary valve 5, so as to limit the degree of the second reduction to that necessary to effect a full service application of the brakes.

If a train is running below a predetermined speed limit, under which conditions the governor valve 28 is seated, then when a brake application is effected, the fluid under pressure supplied to the timing reservoir 67, while the first reduction in brake pipe pressure is being effected, is not vented to the atmosphere, but instead a pressure is built up therein. Then at the end of the first reduction in brake pipe pressure, the start of the second reduction in brake pipe pressure is held back a degree of time sufficient to effect a reduction in the pressure in both the hold-back piston chamber 45 and in the timing reservoir 67, which is freely connected thereto through passage 68, past the ball check valve 70 and through passage 65. When the pressure in the hold-back piston chamber is thus reduced to a predetermined degree, the pressure of the spring 48 shifts the hold-back piston 44 and slide valve 46 to their outward position, in which position, a second reduction in brake pipe pressure is effected in the manner hereinbefore described. It will be noted that in this instance, a distinct time period is imposed between the end of the first and the start of the second reduction in brake pipe pressure.

It will further be noted, that whether a two stage reduction, or a continuous reduction in brake pipe pressure is effected by operation of the split reduction device, is entirely governed by the train speed controlling the governor valve 28, so that as a result, a continuous brake pipe reduction can never occur at a low speed and thus cause damage to a train.

Having now described my invention, what I claim as new and desire to secure by Letters Patent, is:—

1. In an automatic train control apparatus, the combination with a brake pipe, of means for effecting a reduction in brake pipe pressure in two stages comprising a timing reservoir, a valve device subject to the pressure of fluid in said reservoir and operative to initiate the second reduction in brake pipe pressure, and a valve device operable according to the speed of the train for controlling the pressure of fluid in said reservoir.

2. In an automatic train control apparatus, the combination with a brake pipe, of means for effecting a reduction in brake pipe pressure in two stages comprising a timing reservoir, a valve device subject to the pressure of fluid in said reservoir and operative to initiate the second reduction in brake pipe pressure, and speed controlled means for connecting said reservoir to the atmosphere when the speed of the train is in excess of a predetermined speed limit.

3. In an automatic train control apparatus, the combination with a brake pipe, of means for effecting a reduction in brake pipe pressure in two stages comprising a timing reservoir, a valve device subject to the pressure of fluid in said reservoir and operative to initiate the second reduction in brake pipe pressure, and speed controlled means for connecting said reservoir to the atmosphere when the speed of the train is in excess of a predetermined speed limit and for permitting pressure to build up in said reservoir when the speed of the train is below said predetermined speed limit.

4. In an automatic train control apparatus, the combination with a brake pipe, of means for effecting a single stage or a two stage reduction in brake pipe pressure comprising a timing reservoir, a valve device operative by fluid under pressure from said reservoir for effecting the second stage of said two stage reduction in brake pipe pressure, and a valve device governed by the speed of the train for venting fluid under pressure supplied to said reservoir to effect said continuous reduction in brake pipe pressure.

5. In an automatic train control apparatus, the combination with a brake pipe, of means for effecting a continuous or a two stage reduction in brake pipe pressure comprising a timing reservoir, a speed controlled valve device adapted to permit pressure to build up in said reservoir when the speed of the train is below a predetermined speed limit and to prevent the build up of pressure in said reservoir when the speed of the train is above said predetermined speed limit, and a valve device subject to the pressure in said reservoir for initiating the second stage of said two stage reduction.

6. In an automatic train control apparatus, the combination with a brake pipe, of a discharge valve device operable to discharge fluid under pressure from said brake pipe, a timing reservoir, a valve mechanism operable by fluid under pressure from said reservoir to initiate the second stage of a two stage reduction in brake pipe pressure, a valve device subject to the pressure of the fluid discharged from said brake pipe for supplying fluid under pressure to said valve mechanism and reservoir, and valve means controlled by the speed of the train for either venting the fluid under pressure from said valve device and reservoir or permitting the pressure to build up in said reservoir.

7. In an automatic train control apparatus, the combination with a brake pipe, of a discharge valve device operable to discharge fluid under pressure from said brake pipe, a timing reservoir, a valve mechanism operable by fluid under pressure from said reservoir to initiate the second stage of a two stage reduction in brake pipe pressure, a valve device subject to the pressure of the fluid discharged from said brake pipe for supplying fluid under pressure to said valve mechanism and reservoir, and valve means operable to permit the build up of pressure in said reservoir when the speed of the train is below a predetermined speed limit, and operable to prevent the build up of pressure in said reservoir when the speed of the train is above said predetermined speed limit.

8. In an automatic train control apparatus, the combination with a brake pipe, of a discharge valve device operable to discharge fluid under pressure from said brake pipe, a timing reservoir, a valve mechanism operable by fluid under pressure from said reservoir to initiate the second stage of a two stage reduction in brake pipe pressure, a valve device subject to the pressure of the fluid discharged from said brake pipe for supplying fluid under pressure to said valve mechanism and reservoir, and valve means operable to permit the build up of pressure in said reservoir when the speed of the train is below a predetermined speed limit to cause a distinct time period to elapse the first and second reductions in brake pipe pressure and operable to prevent the build up of pressure in said reservoir when the speed of the train is above said predetermined speed limit.

9. In an automatic train control apparatus, the combination with a brake pipe, of a discharge valve device operable to discharge fluid under pressure from said brake pipe, a timing reservoir, a valve mechanism operable by fluid under pressure from said reservoir to initiate the second stage of a two stage reduction in brake pipe pressure, a valve device subject to the pressure of the fluid discharged from said brake pipe for supplying fluid under pressure to said valve mechanism and reservoir, and valve means operable to permit the build up of pressure in said reservoir when the speed of the train is below a predetermined speed limit to cause a distinct time period to elapse the first and second reductions in brake pipe pressure and operable to prevent the build up of pressure in said reservoir when the speed of the train is above said predetermined speed limit to cause a continuous reduction in brake pipe pressure to be effected.

10. In an automatic train control apparatus, the combination with a brake pipe, of a timing reservoir, a valve device subject to the pressure in said reservoir for initiating the second stage of a two stage reduction in brake pipe pressure, and a speed controlled valve device for venting fluid under pressure from said reservoir when the speed of the train is above a predetermined speed limit and for permitting a build up of pressure in said reservoir when the speed of the train is below said predetermined speed limit.

11. In an automatic train control apparatus, the combination with a brake pipe, of a timing reservoir, a valve device subject to the pressure in said reservoir for initiating the second stage of a two stage reduction in brake pipe pressure, a governor device operated in accordance with the speed of the train, and a valve operable by said governor device, said valve having one position for connecting said reservoir to the atmosphere and another position for closing the connection of the reservoir with the atmosphere.

12. In an automatic train control apparatus, the combination with a brake pipe, of means for effecting a continuous or a two stage reduction in brake pipe pressure comprising a timing reservoir, a governor device operated in accordance with the speed of the train, a valve device operable by said governor device to vent said reservoir to the atmosphere when the speed of the train is above a predetermined speed limit to cause a continuous reduction in brake pipe pressure and to prevent the venting of said reservoir to the atmosphere through said valve device when the speed of the train is below said predetermined speed limit, and a valve device subject to the pressure of the fluid in said reservoir to initiate the second stage of said two stage reduction in brake pipe pressure.

In testimony whereof I have hereunto set my hand.

CLAUDE A. NELSON.